No. 751,508. PATENTED FEB. 9, 1904.
B. C. HICKS.
MOTOR VEHICLE.
APPLICATION FILED JUNE 15, 1903.
NO MODEL. 2 SHEETS—SHEET 2.
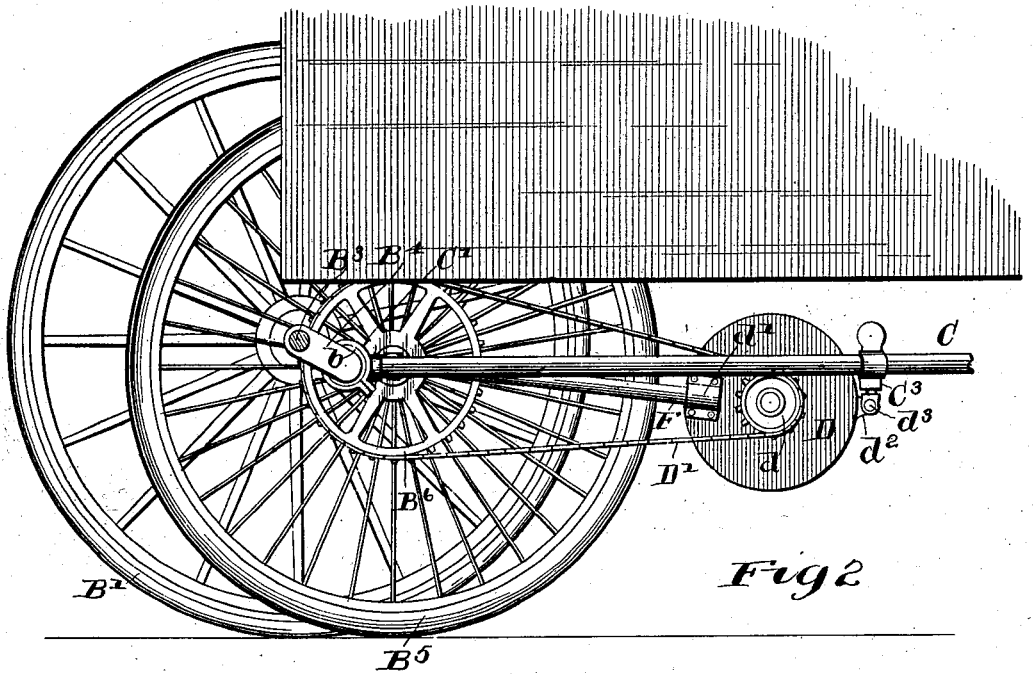
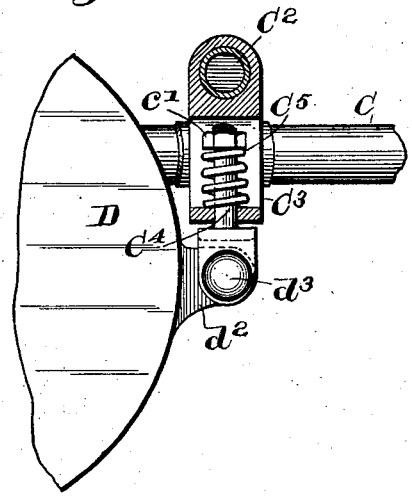
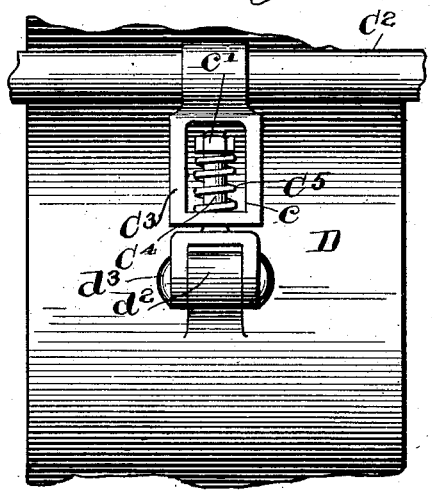
Witnesses:
Carl S. Crawford
William H. Hall
Inventor:
Bohn C. Hicks
by Poole & Brown
his Attorneys No. 751,508. Patented February 9, 1904.

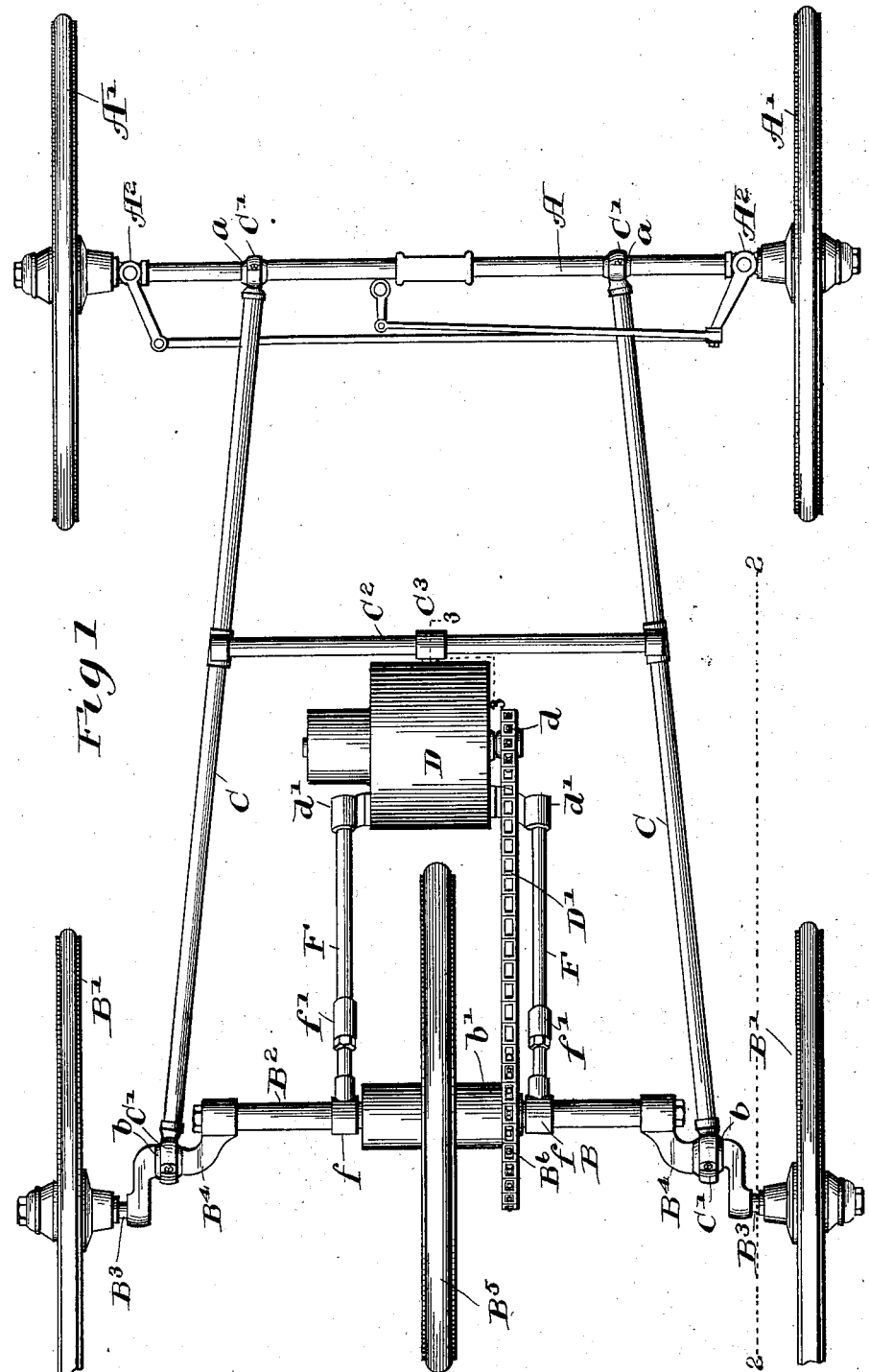

UNITED STATES PATENT OFFICE.

BOHN C. HICKS, OF CHICAGO, ILLINOIS, ASSIGNOR TO CENTER DRIVE AUTOMOBILE COMPANY, OF CHICAGO, ILLINOIS, AND PIERRE, SOUTH DAKOTA, A CORPORATION OF SOUTH DAKOTA.

MOTOR-VEHICLE.

SPECIFICATION forming part of Letters Patent No. 751,508, dated February 9, 1904.

Application filed June 15, 1903. Serial No. 161,459. (No model.)

*To all whom it may concern:*

Be it known that I, BOHN C. HICKS, of Chicago, in the county of Cook and State of Illinois, have invented certain new and useful Improvements in Motor-Mountings for Motor-Driven Vehicles; and I do hereby declare that the following is a full, clear, and exact description thereof, reference being had to the accompanying drawings, and to the letters of reference marked thereon, which form a part of this specification.

This invention relates to improvements in motor-vehicles, and refers more specifically to a novel arrangement for mounting the motor on the vehicle running-gear.

The invention has been designed more especially for that class of running-gears for motor-vehicles wherein the rear axle of the running-gear frame is provided with a central drive or traction wheel and with side supporting-wheels which are rotatively mounted on spindles which are connected with the central portion of the axle by cranks and are therefore axially out of line with respect to the central drive-wheel. In this form of running-gear frame the part of the rear axle between the cranks has a rocking movement in the frame, being capable of rising and falling to permit the centrally-located driving-wheel to rise and fall relatively to the side supporting-wheels when passing over elevations and depressions in the roadway.

One of the objects of this invention is to provide means for mounting or supporting the motor in the running-gear frame, which are so constructed and arranged that rocking of the rear axle in the frame will not bring undue strain or stress to bear upon the parts which support the motor or the connections between said parts and said frame.

Another object of the invention is to provide, in a motor-mounting of this character, means for maintaining constant the distance between the power-transmitting member of the motor and the part which is driven thereby and which will not be affected by movement of the rear axle in the running-gear frame.

A further object of the invention is to provide a cushioning or buffing device between the motor and the running-gear frame which will relieve the motor of shocks and jars coming on the vehicle-frame.

These and other objects of my invention will be more fully explained in the following description of a practical embodiment of my invention shown in the accompanying drawings.

In said drawings, Figure 1 is a plan view of a vehicle running-gear and motor-mounting made in accordance with my invention. Fig. 2 is a side elevation of the rear part of the running-gear, showing part of the vehicle-body. Fig. 3 is a detail taken on line 3 3 of Fig. 1. Fig. 4 is a detail face view of the parts shown in Fig. 3.

The vehicle running-gear, so far as its general construction is concerned, is made similar to the running-gear frame shown in my copending application filed of even date herewith, Serial No. 161,460, and embraces a front axle A, provided with supporting-wheels A', a rear axle B, provided with like supporting-wheels B', and longitudinal side members or reaches C C, connected at their front and rear ends with the front and rear axles. The front axle A is provided at its ends with the usual swinging axle stubs or spindles $A^2$, upon which the wheels A' are roatively mounted, said spindles being connected with the steering-gear in the manner shown in my aforesaid application. The rear axle consists of a central part $B^2$ and spindles $B^3$, upon which the rear wheels B' are mounted, and the part $B^2$ and spindles are connected by means of cranks $B^4$, whereby said spindles and the axis of rotation of the rear wheel B' are out of line with the central part of the axle. Said cranks $B^4$ are connected rigidly at their inner ends with said central part of the axle. The reaches C are connected with the front axle and with the cranks, connecting the rear spindles with the central part of the rear axle by means of joints made in accordance with the construction shown in my said copending application. Said joints embrace fittings C' at the ends of the reaches, provided with inner concave spherical bearing-surfaces which engage spherical enlargements a b on the front axle and the cranks of the rear axle, respectively, these parts operating in the manner described in said application to admit of the necessary flexibility in the frame and movement of the axle to permit the central drive-wheel to rise and fall in passing over elevations and depressions in the roadway and at the same time avoid undue stress or strains being brought upon the joints between the reaches and the front and rear axles.

Referring now to the features of construction constituting my invention and the manner of incorporating said construction in the running-gear frame, said parts are made as follows:

D designates a motor, which, as herein shown, is an electric motor, for driving the center or traction wheel $B^5$ on the rear axle. Said driving-wheel is driven from said motor through the medium of a link belt $D'$, trained about a pulley $d$ on the motor and a gear-wheel $B^6$ on the hub $b'$ of said central driving-wheel.

The motor is suspended at its front end from a cross-bar $C^2$, which extends between and is connected at its ends with the reaches C, and the motor is supported at its rear end from the central part of the rear axle through the medium of rods F F, which are attached at their forward ends to lugs $d'$, which are attached rigidly to or formed integral with the casing of the motor and are loosely connected at their rear ends to the rear axle in a manner to permit said axle to turn relatively thereto during its vertical or rocking movement. As herein shown, the rods F are provided at their rear ends with metal fittings $f$, having transverse openings through which the shaft extends, whereby the axle may turn therein. Said rods are provided with take-up devices $f'$ for the purpose of properly adjusting the length of the rods to correspond with the distance between the motor and rear axle, and thereby maintain a proper tension on the driving connection, as the link belt shown. The said motor is suspended from the cross-bar $C^2$ through the medium of a hanger $C^3$, which is loosely or pivotally connected at its upper end with said cross-bar, the hanger being shown as provided at its upper end with a transverse aperture through which the cross-bar extends. Said hanger is hollowed to provide a space $c$.

$C^4$ designates a short rod or bolt, which extends upwardly through the casting into said space and through a spiral spring $C^5$, located in said space. Said rod is provided at its upper end with a head or nut $c'$, between which and the lower part of the hanger is interposed the spring $C^5$. The lower end of said rod is forked and fits over and is loosely connected with a lug $d^2$, projecting forwardly from the motor-casing by means of a pin $d^3$, extending transversely through said fork and lug. With this construction when the straight central portion of the axle rises or falls, as when the central drive-wheel mounted thereon rises and falls in passing over elevations and depressions in the roadway, and the distance between the said axle and the transverse rod $C'$ is therefore varied, the motor swings upon the hanger $C^2$ so as to permit the motor to shift freely backwardly and forwardly with the said central part of the axle. The rods F, constituting the connection between the motor and the rear axle, constitute also a tension device for the link belt, which connects the motor with the said rear axle, whereby the proper tension on said belt is maintained, notwithstanding the shifting of the motor in the manner described. The spring incorporated in the hanger serves to prevent shocks and jars coming upon the vehicle from being transmitted with their full force to the motor, and thereby protects the motor mechanism from disarrangement due to such causes.

It is obvious that changes may be made in the structural details shown without departing from the spirit of my invention, and I do not wish to be limited to such details except as hereinafter made the subject of specific claims.

I claim as my invention—

1. In a vehicle running-gear the combination with a crank-axle mounted in said gear in a manner to rock therein, a central drive or traction wheel rotatively mounted on said axle, and supporting-wheels rotatively mounted on spindles carried by the cranks of said axle, of a motor geared to said drive-wheel and supported from said axle and pivotally connected with the running-gear whereby it partakes of the rocking movement of said axle.

2. In a vehicle running-gear the combination with a crank-axle mounted in said gear in a manner to rock therein, a central drive-wheel mounted on said axle, and supporting-wheels rotatively mounted on spindles carried by the cranks of said axles, of a motor geared to said drive-wheel and pivotally suspended at its front end from the running-gear frame, and connected at its rear with said axle by rigid connecting rods or bars which are flexibly connected with said rear axle.

3. In a vehicle running-gear the combination with front and rear axles, and reaches connecting the said axles, said rear axle comprising a central part and two spindles which are connected with said central part by cranks, the rear ends of said reaches being flexibly connected with said cranks, a central drive or traction wheel rotatively mounted on said axle and supporting-wheels mounted on said spindles, of a motor geared to said central drive-wheel and pivotally supported at its front end from the running-gear, and rods or bars which are connected at their forward ends with the motor-casing and at their rear ends with the said axle on either side of said central drive-wheel.

4. In a vehicle running-gear, the combination with front and rear axles, and reaches connecting said axles, the rear axle comprising a central part and two spindles which are connected with said central part by cranks, and the reaches being connected with the cranks by flexible joints, of a motor, a cross-bar extending between said reaches from which said motor is pivotally suspended at its forward end, and supporting bars or rods connected with the motor-casing and with the central part of said rear axle.

5. In a vehicle running-gear, the combination with the side reaches and the rear axle, said rear axle embracing a central part and two spindles which are connected with the central part by cranks, the rear ends of said reaches being flexibly connected with said cranks, and a cross-bar extending between said reaches, of a motor, a hanger depending from and hinged to said cross-bar and to the lower end of which said motor is pivoted, and rigid bars or rods for supporting said motor from the rear axle.

6. In a vehicle running-gear the combination with a crank-axle mounted in said gear in a manner to rock therein, a central drive or traction wheel and supporting-wheels rotatively mounted on spindles carried by the cranks of said axle, of a motor geared to said drive-wheel and supported from said axle and pivotally connected with the running-gear frame whereby it partakes of the rocking movement of said axle, and a cushioning or buffing device interposed between the motor and running-gear.

7. In a vehicle running-gear, the combination with the side reaches and the rear axle, said rear axle embracing a central part and two spindles which are connected with the central part by cranks, the reaches being flexibly connected with said cranks, and a cross-bar supported on said reaches, of a motor, a hanger depending from and hinged to said cross-bar, a part supported in said hanger and pivotally connected with the casing of the motor, a spring interposed between said part and hanger, and means for supporting said motor from the rear axle.

In testimony that I claim the foregoing as my invention I affix my signature, in presence of two witnesses, this 8th day of June, A. D. 1903.

BOHN C. HICKS.

Witnesses:
TAYLOR E. BROWN,
JOHN F. FARGO.